United States Patent
Moehring et al.

[11] 3,867,717
[45] Feb. 18, 1975

[54] STALL WARNING SYSTEM FOR A GAS TURBINE ENGINE

[75] Inventors: John Theodore Moehring; Virgil Willis Lawson, both of Cincinnati, Ohio

[73] Assignee: General Electric Company, Lynn, Mass.

[22] Filed: Apr. 25, 1973

[21] Appl. No.: 354,303

[52] U.S. Cl......... 340/27 SS, 60/39.28 R, 73/117.3, 235/150.2
[51] Int. Cl. ............................................ G01m 15/00
[58] Field of Search.......... 340/27 R, 27 SS, 27 NA; 73/116, 117.3; 60/39.28 R, 39.29 R; 235/150.2, 150.21

[56] References Cited
UNITED STATES PATENTS

| | | | |
|---|---|---|---|
| 2,848,869 | 8/1958 | Russ | 60/39.28 R |
| 3,267,669 | 8/1966 | Tissier | 60/39.28 R |
| 3,295,316 | 1/1967 | Beatrice et al. | 60/39.28 R |
| 3,426,322 | 2/1969 | Balo | 340/27 SS |
| 3,512,128 | 5/1970 | Maki | 73/116 |
| 3,630,023 | 12/1971 | Lazar et al. | 73/117.3 |
| 3,695,037 | 10/1972 | Alberani | 60/39.28 R |
| 3,736,796 | 6/1973 | Hohenburg | 73/117.3 |

*Primary Examiner*—Kathleen H. Claffy
*Assistant Examiner*—Randall P. Myers
*Attorney, Agent, or Firm*—Derek P. Lawrence

[57] ABSTRACT

A stall warning system for a gas turbine engine precludes the possibility of an erroneous indication of compressor stall by simultaneously monitoring the air pressure at the discharge end of the engine compressor together with the temperature of the turbine section of the engine. Initiation of the stall warning signal is made contingent upon the simultaneous receipt of signals indicative of both an abnormally low compressor discharge pressure and an abnormally high turbine temperature. In this manner an erroneous indication of compressor stall, as may occur during normal operation of the engine when the compressor discharge pressure is low, may be positively precluded.

23 Claims, 9 Drawing Figures

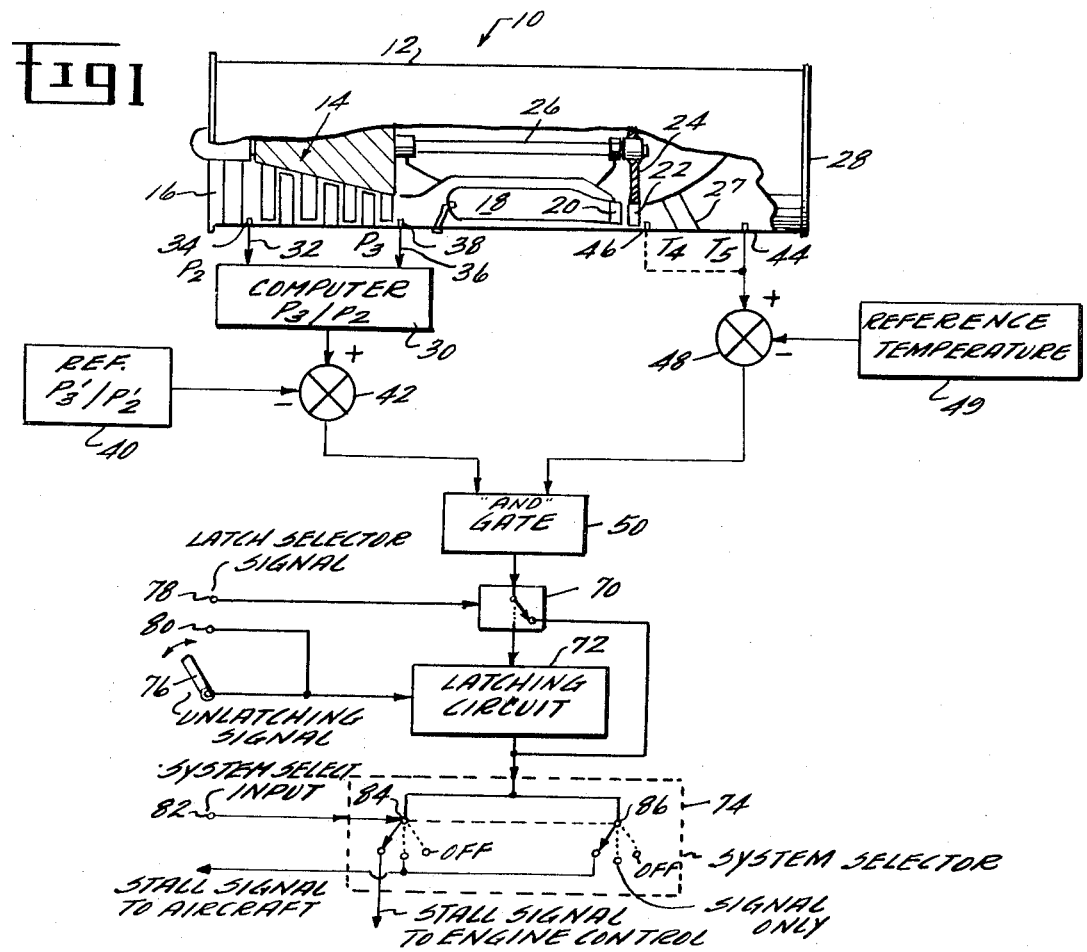
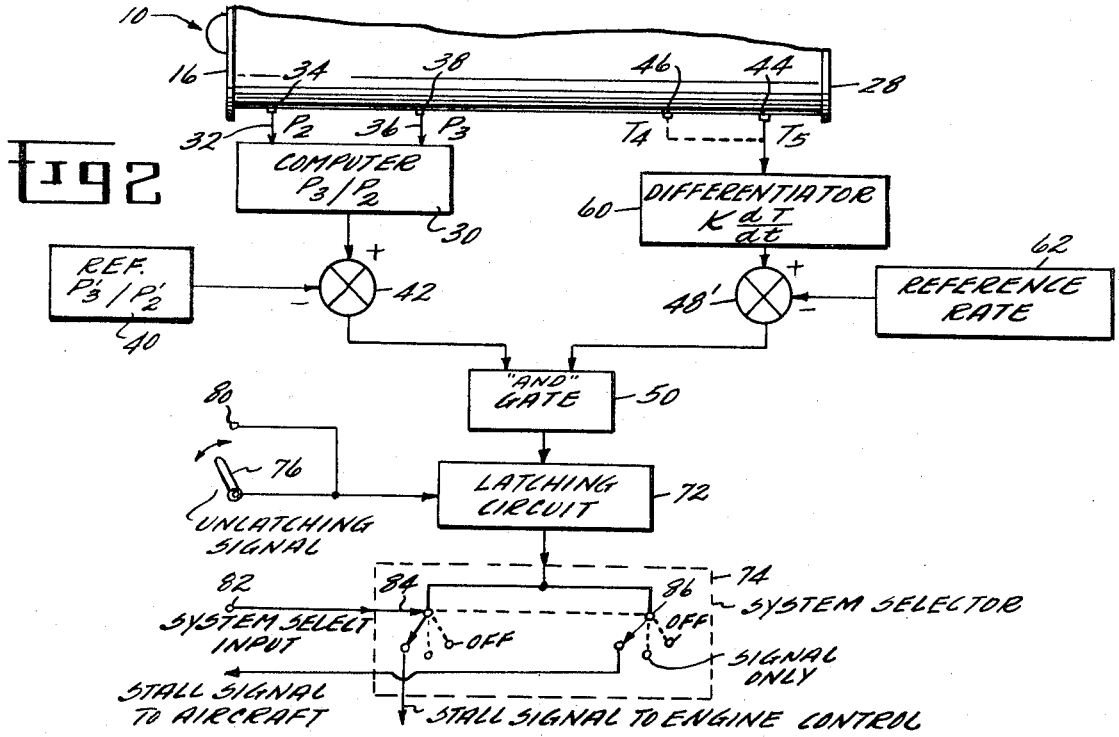

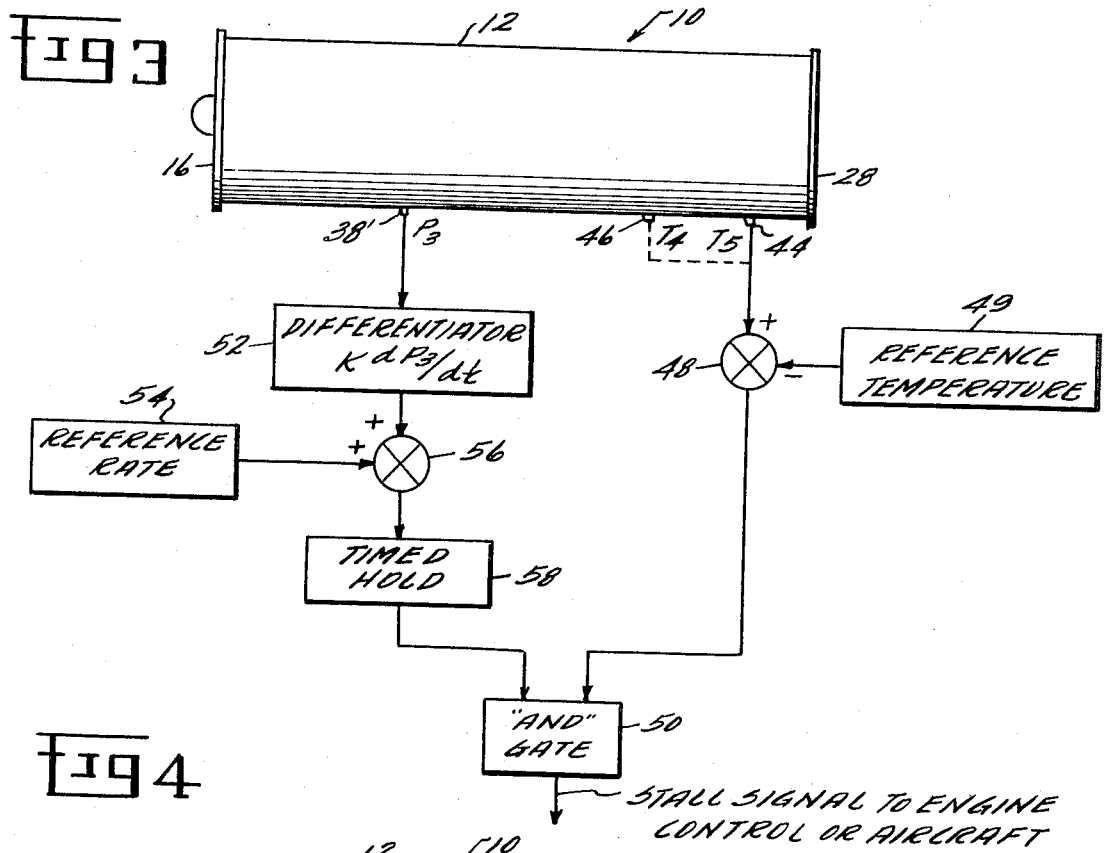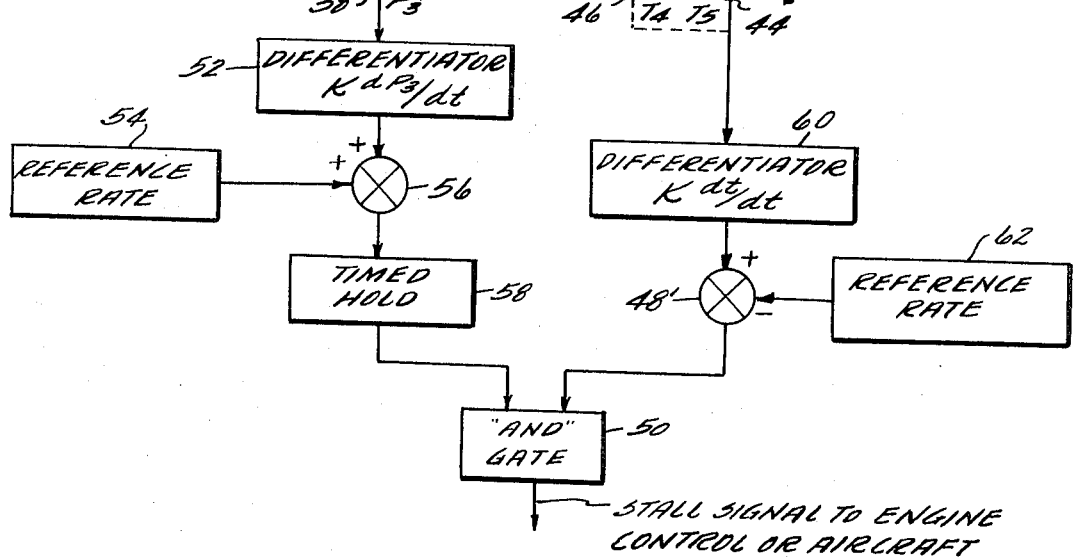

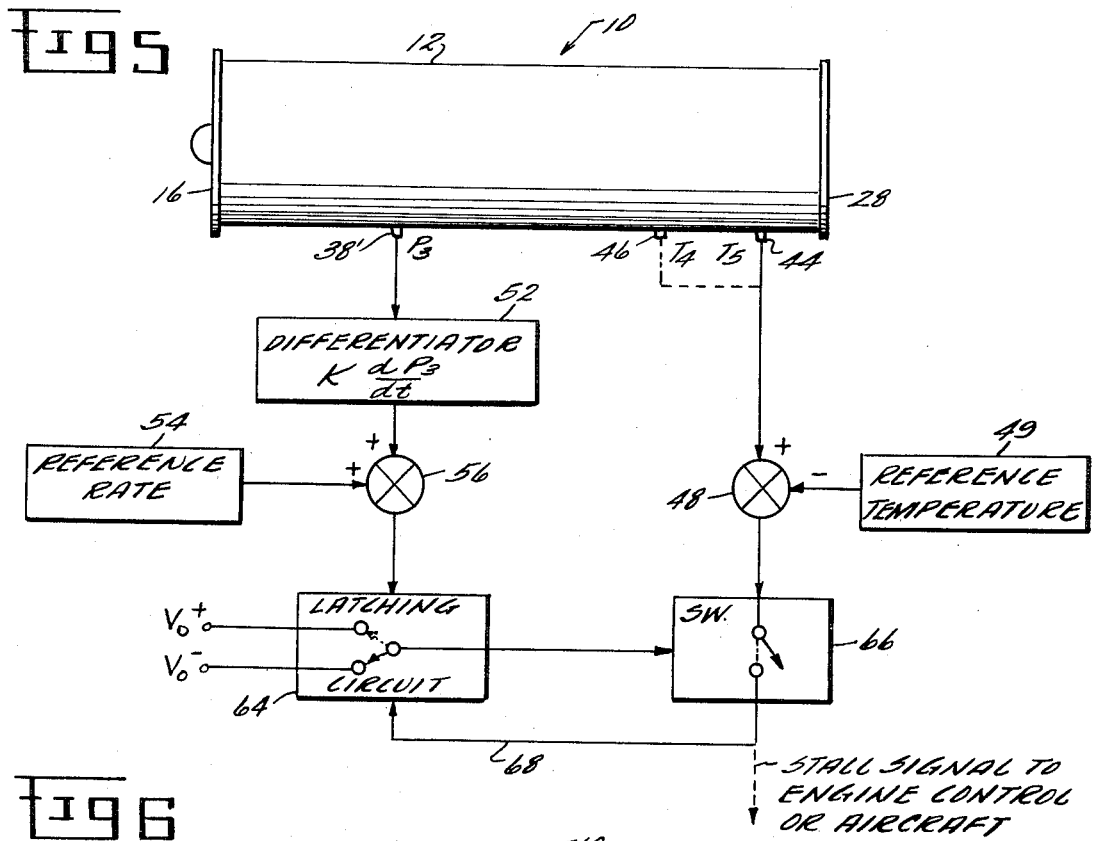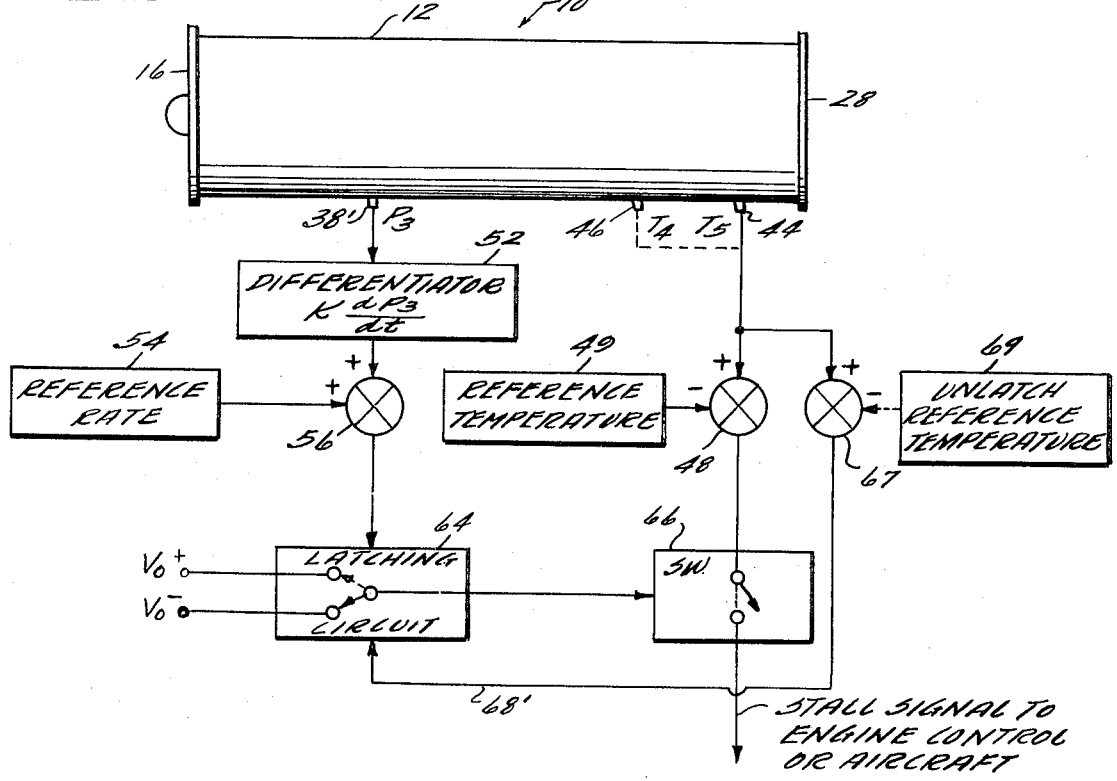

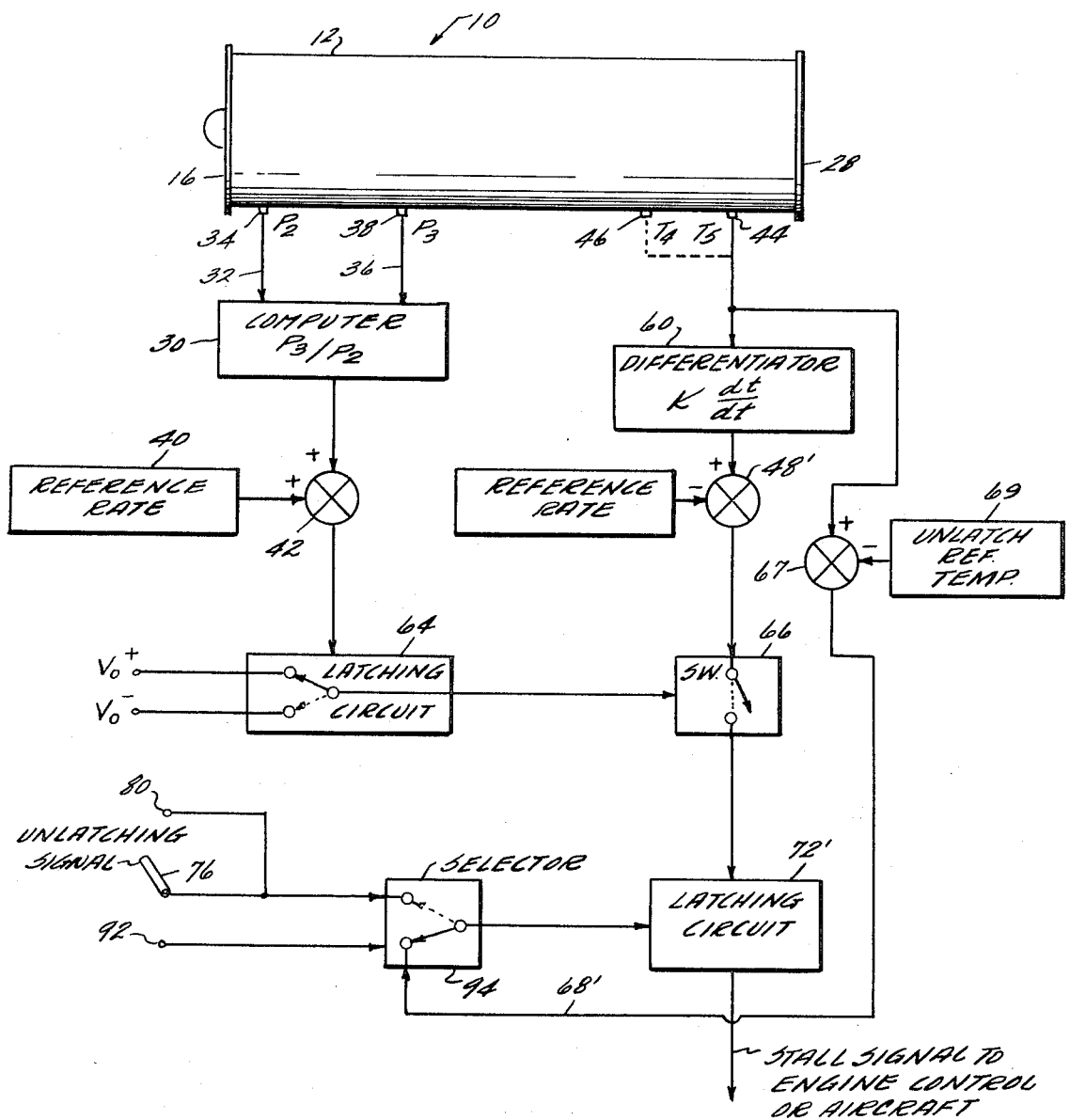

STALL WARNING SYSTEM FOR A GAS TURBINE ENGINE

BACKGROUND OF THE INVENTION

This invention relates to a compressor stall warning system for a gas turbine engine and, more particularly, to a compressor stall warning system for a gas turbine engine which precludes the possibility of an erroneous stall warning by simultaneously monitoring both compressor pressure and turbine temperature.

The invention described herein and claimed herein resulted from work done under United States Government Contract FA-SS-66-6. The United States Government has an irrevocable, non-exclusive license to practice and have practiced the invention claimed herein, including the unlimited right to sublicense others to practice and have practiced the claimed invention for any purpose whatsoever.

During operation of an aircraft gas turbine engine, there may occur a phenomenon known as compressor stall, wherein the pressure ratio of the compressor initially exceeds some critical value at a given speed, resulting in a subsequent reduction of compressor pressure ratio and airflow delivered to the engine combustor. Compressor stall may result from a variety of reasons, such as when the engine is accelerated too rapidly, or when the inlet profile of air pressure or temperature becomes unduly distorted during normal operation of the engine. During supersonic flight, compressor stall may result from a condition commonly referred to as "unstart" which may be precipitated by the incursion of strong normal shock waves at the engine inlet, resulting in a drop in inlet pressure. Compressor damage due to the ingestion of foreign objects or a malfunction of a portion of the engine control system may also result in a compressor stall.

If such a condition is undetected and permitted to continue, the combustor temperatures and the vibratory stresses induced in the compressor may become sufficiently high to cause damage to the gas turbine engine. Compressor stall may be alleviated by reducing the fuel flow to the combustor or by bleeding a portion of the airflow intermediate the compressor inlet and discharge. Either of these corrective actions can be accomplished automatically through an engine control, in which case an initiating control signal indicative of compressor stall would have to be applied to the control. In a supersonic aircraft having a variable geometry inlet duct, compressor stall will generally require the further corrective action of resetting the inlet duct area, in which case a control signal indicative of compressor stall would also have to be applied to the inlet control. Alternatively, corrective action could also be initiated manually, as, for example, in a gas turbine powered aircraft by the pilot cutting back on the engine throttle. Here also a control signal indicative of compressor stall would have to be supplied to the aircraft cockpit. In either case, regardless of whether the compressor stall is corrected automatically through the fuel and inlet controls or manually through the engine throttle, there still must be provided a true and accurate indication of compressor stall.

The fact that air pressure at the discharge end of the gas turbine engine compressor rapidly decays during stall has led to the monitoring of compressor discharge pressure or compressor pressure ratio as an indication of compressor stall. However, a rapid decay in the compressor discharge pressure, and hence the compressor pressure ratio, may also occur when the engine is decelerated, in which case an erroneous indication of compressor stall would occur. Furthermore, the low compressor pressure ratio commonly associated with very high altitude flight could also yield an erroneous indication of compressor stall.

Therefore, it is a primary object of this invention to provide a stall warning system for a gas turbine engine which precludes an erroneous indication of compressor stall occurring during normal operation when the compressor pressure ratio may become very low for reasons other than a stalled compressor.

It is also an object of this invention to provide a stall warning system which simultaneously monitors compressor discharge pressure and turbine temperature, thereby making any stall signal contingent upon the simultaneous occurrence of an abnormal decrease in the compressor discharge pressure and abnormal increase in the turbine temperature, or an abnormally low compressor pressure ratio and an abnormally high turbine temperature.

SUMMARY OF THE INVENTION

The gas turbine engine stall warning system of this invention includes a means for detecting compressor pressure, together with a means for simultaneously detecting a temperature indicative of the engine turbine temperature. First comparator means are included to receive the detected compressor pressure and provide an output signal representative of an abnormal decrease in compressor pressure. There is also included a second comparator means for receiving the detected temperature and providing an output signal representative of an abnormal increase in turbine temperature. Gate means are further included to provide an output signal indicative of engine stall upon receipt of both a signal from the first comparator means representative of an abnormal decrease in compressor pressure and a signal from the second comparator means representative of an abnormal increase in detected temperature. In this manner, the possibility of a false stall signal occurring during normal operation of the engine, when the compressor pressure rapidly decays, can be precluded.

BRIEF DESCRIPTION OF THE DRAWINGS

While the specification concludes with claims distinctly claiming and particularly pointing out the invention described herein, it is believed that the invention will be more readily understood by reference to the discussion below and the accompanying drawings, in which:

FIG. 1 is a schematic representation of the stall warning system of this invention as connected to a typical gas turbine engine;

FIG. 2 is a schematic representation of an alternate embodiment of the stall warning system of FIG. 1.

FIG. 3 is a schematic representation of another embodiment of the stall warning system of FIG. 1.

FIG. 4 is a schematic representation of another embodiment of the stall warning system of FIG. 1.

FIG. 5 is a schematic representation of another embodiment of the stall warning system of FIG. 1.

FIG. 6 is a schematic representation of an alternate embodiment of the stall warning system of FIG. 5.

3

Figure 7:
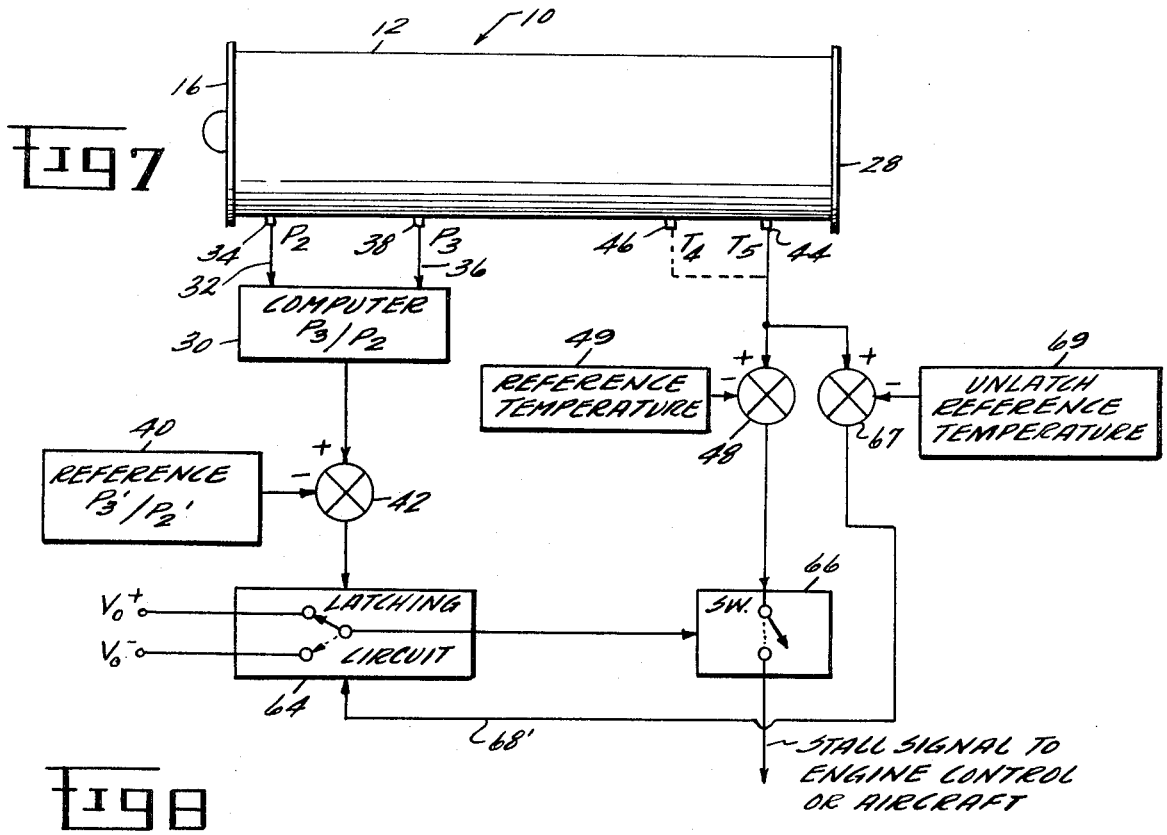

FIG. 7 is a schematic representation of an alternate embodiment of the stall warning system of FIG. 1.

Figure 8:
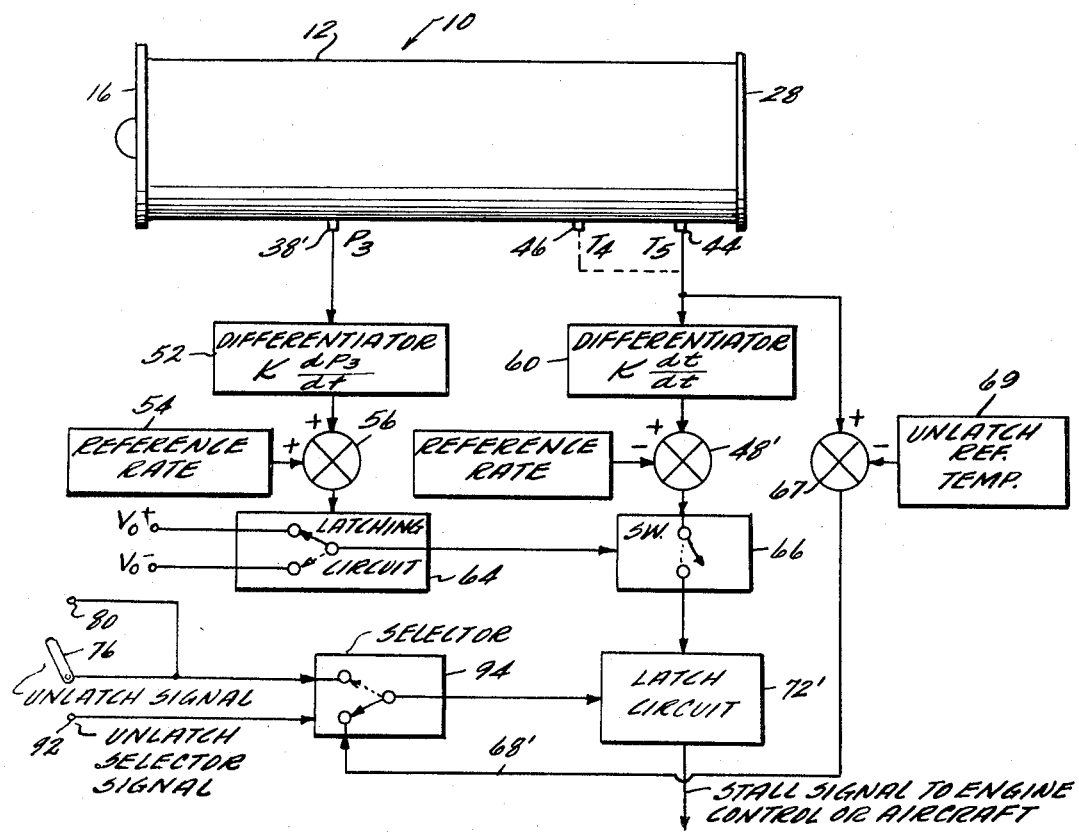

FIG. 8 is a schematic representation of an alternate embodiment of the stall warning system of FIG. 1.

FIG. 9 is a schematic representation of an alternate embodiment of the stall warning system of FIG. 1.

DESCRIPTION OF THE PREFERRED EMBODIMENT

Referring to FIG. 1, a gas turbine engine is shown at 10 as comprising a cylindrical housing 12 having a compressor 14, which may be of the axial flow type, journalled within the housing adjacent its forward end. The compressor 14 receives air through an annular air inlet 16 and delivers compressed air to a combustion chamber 18. Within the combustion chamber 18 air is burned with fuel and the resulting combustion gases are directed by a nozzle or guide vane structure 20 to the rotor blades 22 of a turbine rotor 24 for driving the rotor. A shaft 26 drivably connects the turbine rotor 24 with the compressor 14. From the turbine blades 22, the exhaust gases discharge rearwardly through an exhaust duct 27 into the surrounding atmosphere through an exhaust nozzle 28, whereby the gas turbine engine is provided with forward propulsive thrust. The gas turbine structure so far described is conventional.

The stall warning system of this invention includes a computer 30 which receives a first input signal representative of compressor inlet pressure $P_2$ and a second input signal representative of compressor discharge pressure $P_3$. The compressor inlet pressure signal $P_2$ is received through a conduit 32 which terminates in a pressure pickup inlet 34 stationed within the engine annular inlet 16, and the compressor outlet pressure signal $P_3$ is received through a conduit 36 which terminates in a pressure pickup inlet 38 suitably disposed at the discharge side of the compressor 14. From the compressor inlet pressure signal $P_2$ and the compressor discharge pressure signal $P_3$, the computer 30 calculates the pressure ratio $P_3/P_2$ which is subsequently compared to a constant reference pressure ratio signal $P_3'/P_2'$ furnished by a reference generator 40. The reference pressure ratio signal $P_3'/P_2'$ is subtracted from the computed pressure ratio signal $P_3/P_2$ at the summing junction 42 so as to provide a positive output signal only when the computed pressure ratio signal $P_3/P_2$ exceeds the predetermined reference pressure ratio signal $P_3'/P_2'$.

Thermocouples 44 may be suitably disposed in the turbine exhaust duct 27 to provide a signal indicative of the temperature of the turbine exhaust stream. Alternatively, in place of the thermocouples, a pyrometer 46 may be suitably disposed adjacent the turbine rotor 24 to provide a signal indicative of the temperature of the rotor blades 22. However, in either case the measured temperature is compared with a constant reference temperature signal furnished by a reference generator 49. The reference temperature signal is subtracted from the measured temperature signal at the summing junction 48 so as to provide a positive output signal only when the measured temperature signal exceeds the predetermined reference temperature signal.

A gate 50 receives and discriminates the signals from the summing junctions 42 and 48 respectively, whereupon the output signal from the gate provides an indication of compressor stall. The output signal from gate 50 may be directed to the cockpit of an aircraft (not shown) to provide an aircraft operator with a visual indication of compressor stall, thereby enabling him to take corrective action. Alternatively, the output signal from gate 50 could be directed to the gas turbine engine control (also not shown) so as to automatically initiate corrective action, such as a reduction in fuel flow. The stall signal may also be directed to an inlet duct control to automatically reset the inlet duct geometry to a more favorable configuration.

As previously discussed, the acceleration of a gas turbine engine may result in a compressor stall or surge wherein the pressure ratio $P_3/P_2$ of the compressor may initially exceed some critical value, resulting in a subsequent drastic reduction of compressor pressure ratio and airflow delivered to the combustor. If such a condition is undetected and allowed to continue, the combustor temperatures and vibratory stresses induced in the compressor may become sufficiently high to cause damage to the gas turbine engine. The condition may be alleviated by reducing the fuel flow to the combustor, by bleeding an increased portion of the airflow intermediate the compressor inlet and discharge, or by changing the configuration of a variable geometry inlet. Either of these corrective actions can be accomplished automatically through the engine or inlet control, in which case an initiating control signal indicative of compressor stall must be applied to the control. Alternatively, the aircraft operator can also initiate corrective action by manually cutting back on the engine throttle in which case a control signal indicative of compressor stall must be furnished to the aircraft cockpit. In either case, regardless of whether the compressor stall is corrected automatically through the engine or inlet control, or manually through the engine throttle, there still must be provided a signal which is a true and accurate indication of compressor stall.

The rapid decay in compressor discharge pressure $P_3$ with compressor stall has led to the monitoring of compressor discharge pressure $P_3$ or compressor pressure ratio $P_3/P_2$ as an indication of compressor stall. However, a rapid decay in the compressor discharge pressure $P_3$ and, hence, the compressor pressure ratio $P_3/P_2$ may also occur when the engine is decelerated, thus providing a false indication of compressor stall. In addition, the compressor pressure ratio $P_3/P_2$ may become low for normal flight operation at high altitude, also providing a false indication of compressor stall. The stall warning system of this invention, however, specifically precludes such false indications of compressor stall by simultaneously monitoring either turbine temperature $T_4$ or turbine exhaust gas temperature $T_5$, together with compressor pressure ratio $P_3/P_2$. Therefore, during a normal engine deceleration, when a rapid decay in the compressor pressure ratio is followed by a corresponding decay in both the turbine temperature and the turbine exhaust, or during high altitude operation when $T_5$ and $T_4$ are always below the prescribed limits, there can be no misleading indication of compressor stall.

During engine operation, the pressure pickup inlets 34 and 38 continuously monitor the compressor inlet and discharge pressures respectively. The computer 30 converts these pressure signals into an output signal representative of the pressure ratio across the compressor and, as is readily apparent, the output pressure ratio signal from the computer may be either electrical or hydromechanical. A minimum compressor pressure ratio $P_3'/P_2'$ is determined empirically for most conditions of normal compressor operation, and a signal representative of this pressure ratio is provided by the reference generator 40. During normal engine operation, the computed pressure ratio $P_3/P_2$ generally exceeds the reference pressure ratio $P_3'/P_2'$ providing a positive output signal from the summing junction 42. Gate 50 is arranged to discriminate against this positive input signal and provide a zero output signal regardless of the other input signal from summing junction 48. However, should the computed pressure ratio signal $P_3/P_2$ decay below the minimum reference pressure ratio signal $P_3'/P_2'$, due either to a rapid deceleration of the gas turbine engine or a compressor stall, then the output signal from the summing junction 42 will become negative and provide a negative input to the gate 50.

Thermocouples 44 also continuously monitor the temperature of the turbine exhaust gases. A maximum turbine exhaust temperature is determined empirically for most conditions of normal engine operation and a signal representative of this temperature is provided by the reference generator 49. During normal engine operation, the reference exhaust temperature generally exceeds the measured exhaust temperature providing a negative output signal from the summing junction 48. Gate 50 is arranged to discriminate against this negative input signal and provide a zero output signal regardless of the other input signal from summing junction 42. However, should the measured exhaust temperature exceed the reference exhaust temperature due to a compressor stall, then the output from the summing junction 48 will become positive and provide a positive input to the gate 50.

Gate 50 provides an output stall signal only upon receipt of a positive input signal from summing junction 48 and a negative input signal from summing junction 42. As now becomes readily apparent, the possibility of a false stall signal due to a rapid deceleration of the gas turbine engine or high altitude operation has been precluded by the simultaneous monitoring of the compressor pressure ratio and the turbine exhaust temperature. A rapid decay in the compressor pressure ratio due to normal engine deceleration or high altitude operation will not precipitate an increase in turbine temperature, and hence the turbine exhaust temperature will remain below the reference temperature. The input signal from summing junction 48 will, therefore, remain negative and preclude the initiation of a stall signal from gate 50. However, during a compressor stall, not only will the compressor pressure ratio rapidly decay, but there will also be a correspondingly rapid increase in turbine temperature, which will be reflected by an increase in the turbine exhaust temperature. When the exhaust temperature exceeds the reference temperature, the output signal from summing junction 48 will become positive and the gate 50 will generate an output stall signal provided the pressure ratio signal from summing junction 42 remains negative. Upon initiation of corrective action, the turbine exhaust temperature will start to decrease with a concurrent increase in the compressor pressure ratio. When either the compressor pressure ratio signal increases above the reference pressure ratio signal, or the turbine exhaust temperature decreases below the reference temperature, there will occur a change in the polarity of the correspsonding input signal to gate 50. The stall signal from gate 50 will then turn off indicating that the stall has been cleared.

The stall signal from gate 50 will remain only for the time period that the actual compressor pressure ratio $P_3/P_2$ remains lower than the reference pressure ratio $P_3'/P_2'$ and the actual turbine temperature remains greater than the reference turbine temperature. Thus it will be appreciated that if the pressure ratio $P_3/P_2$ recovers above the reference level $P_3'/P_2'$, then the stall signal from gate 50 will disappear even though the turbine temperature may still continue above the level of the reference temperature. If the stall signal from gate 50 is used to automatically apply stall correcting action, such as a cutdown in fuel flow to the engine, then the engine control would subsequently increase fuel flow after the stall signal from gate 50 disappears even though the turbine temperature may still be above the reference temperature. Therefore, it may be necessary, depending on the cause of the stall, to diagnose and remove the disturbing influence before reinstating fuel flow to the engine; otherwise the stall signal and fuel cutdown sequence will continue to cycle repetitively. To this end, a latching circuit 72 is included in order to provide an additional time period after the initial compressor stall corrective action. The aircraft pilot may choose whether to utilize the latching circuit 72 through a latch selector 70 which is controlled by a pilot initiated signal from input 78. Latching circuit 72 may be unlatched in order to reinstate engine power following the stall clearing action by either a pilot initiated signal received through input 80 or by a signal initiated by retarding the throttle lever 76 to a predetermined lower power setting such as flight idle.

It may also be desirable under certain operating conditions, such as during takeoff and landing, to provide a stall warning signal only to the aircraft cockpit, thereby enabling the pilot to have sole discretion as to whether to cut back the fuel flow to the engine combustor through the engine throttle. To this end, there may be provided a system selector 74 having a pair of ganged three-position switches 84, 86 controlled by a pilot initiated signal from input 82. When the switches 84, 86 are switched into the positions shown in FIG. 1, there is provided a stall signal to both the aircraft cockpit and engine control, in which case the pilot will be warned of a stalled compressor and corrective action will be automatically initiated. When switches 84, 86 are rotated counter-clockwise to the center pole position, there will be provided a stall signal only to the aircraft cockpit and the pilot will have sole discretion as to whether to initiate corrective action by cutting back fuel flow to the engine combustor.

In some engines, particularly those utilizing air cooled turbine blades operating at high turbine gas temperature, it may be necessary to minimize the time delay before sensing an abnormally high turbine temperature indicative of engine stall. A faster response may be obtained by computing the time derivative or rate of increase of turbine temperature rather than the actual turbine temperature. Referring now to FIG. 2, where like numerals designate previously described elements, there is shown an alternate embodiment for the stall detection system of this invention. The pressure pickup inlets 34 and 38 continuously monitor the compressor inlet and discharge pressures respectively while the computer 30 converts these pressure signals into an output signal representative of the pressure ratio across the compressor as previously discussed. A minimum pressure ratio is provided by the reference generator 40 and this reference pressure ratio is combined with the measured pressure ratio at summing junction 42.

Agaain, thermocouples 44 may be suitably disposed in the exhaust duct 27 to provide a system indicative of the temperature of the turbine exhaust stream. Alternatively, the pyrometer 46 adjacent the turbine rotor could be used in place of the thermocouples as previously discussed. A differentiator 60 is included and receives the turbine exhaust temperature for differentiation thereof so as to provide an output signal representative of the rate of change of turbine exhaust temperature. A maximum rate of change for turbine exhaust temperature is determined empirically for most conditions of normal compressor operation, and a signal representative of the rate of change of temperature is provided by the reference generator 62. The signal from differentiator 60 representing the measured rate of change of turbine exhaust temperature is added to the negative signal from reference generator 62 at the summing junction 48' so as to provide a positive signal only when the actual turbine exhaust temperature is increasing at a rate faster than the reference rate of temperature change. Again, as is readily apparent, the rate of change of turbine exhaust temperature will be positive only when the turbine exhaust temperature is increasing. The gate 50 in like manner receives and discriminates the signals from the summing junctions 42 and 48' respectively whereupon the output signal from the gate provides an indication of stall, and, as is readily apparent, the pressure, temperature and rate signals may be either hydromechanical or electric.

During engine operation thermocouples 44 continuously monitor the temperature of the turbine exhaust at 27 and the differentiator provides a continuous signal indicative of the rate of change of turbine exhaust temperature. During normal engine operation, the turbine exhaust temperature will not increase at a rate greater than the reference rate, and the output signal from the summing junction 48' will remain negative. While the output signal from junction 48' remains negative, the gate 50 provides a zero output signal regardless of the other input signal from summing junction 42. However, should the turbine exhaust temperature start to rapidly increase at a rate greater than the reference rate, then the output signal from the summing junction will become positive and provide a positive input signal to the gate 50. The gate 50 again provides an output stall signal only upon receipt of a positive input signal from summing junction 48' and a negative input signal from summing junction 42, thus precluding the possibility of a false stall signal due to a rapid deceleration of the engine or otherwise.

It should be noted that the latch selector 70 has not been provided because the stall signal from gate 50 will be present for only a limited period of time during which the turbine exhaust temperature increases at a rate faster than the turbine exhaust temperature reference rate. Because the actual turbine temperature will likely remain dangerously high even after the rate of increase has decreased below the reference rate, it is necessary that the latching circuit not be bypassed in order that the stall correcting action persist for at least the duration of the stall or over-temperature condition.

Referring now to FIG. 3, where like numerals designate previously described elements, there is shown another embodiment for the stall detection system of this invention. Compressor discharge pressure is monitored through a pressure pickup inlet 38' suitably disposed at the discharge side of the compressor. A differentiator 52 is included and receives the compressor discharge pressure signal for differentiation so as to provide an output signal representative of the rate of change of compressor discharge pressure. A maximum rate of change for compressor discharge pressure is determined empirically for most conditions of normal compressor operation, and a signal representative of this rate of change of pressure is provided by a reference generator 54. The signal from differentiator 52, representing the measured rate of change of compressor discharge pressure, is added to the signal from reference generator 54 at the summing junction 56 so as to provide a negative output signal only when the actual compressor discharge pressure is decreasing at a rate faster than the referenced rate of pressure change. As is readily apparent, the rate of change of compressor discharge pressure will be negative only when the compressor discharge pressure is decreasing. The signal from summing junction 56 is received and held at a timed hold 58 for a predetermined time increment for reasons which will be made obvious from the following discussion.

During engine operation, the pressure pickup inlet 38' continuously monitors compressor discharge pressure and the differentiator provides a continuous signal indicative of the rate of change of compressor discharge pressure. During normal engine operation, the compressor discharge pressure will not decrease at a rate faster than the reference rate and the output signal from the summing junction 56 will remain positive. While the output signal from junction 56 remains positive, the gate 50 provides a zero output signal regardless of the other input signal from summing junction 48. However, should the compressor discharge pressure start to rapidly decay at a rate greater than the reference rate due to a rapid deceleration of the gas turbine engine or a compressor stall, or otherwise, then the output signal from the summing junction 56 will become negative and provide a negative input signal to the gate 50. While the output signal from junction 48 remains negative, the gate 50 provides a zero output signal regardless of the other input signal from summing junction 56. However, should the turbine exhaust temperature start to increase above the reference temperature, then the output signal from the summing junction 48 will become positive and provide a positive input signal to the gate 50. The gate 50 again provides an output stall signal only upon receipt of a positive input signal from summing junction 48 and a negative input signal from summing junction 56, thus precluding the possibility of a false stall signal due to a rapid deceleration of the engine or otherwise. A timed hold 58 is provided to synchronize the pressure rate signal from summing junction 56 with the temperature signal from summing junction 48. This is necessary in order to compensate during a compressor stall for the lag between the time when the compressor discharge pressure first starts to decrease and the time when the output of the turbine temperature sensor first starts to increase.

Referring now to FIG. 4, where like numerals again designate previously described elements, there is shown still another embodiment for the stall detection system of this invention wherein the stall detecting parameters utilized are the rate of change of compressor discharge pressure as previously discussed in relation to FIG. 3 and the rate of change of turbine temperature as previously discussed in relation to FIG. 2.

During engine operation, the pressure pickup inlet 38' continuously monitors compressor discharge pressure and the differentiator provides a continuous signal indicative of the rate of change of compressor discharge pressure. Thermocouples 44 also continuously monitor the temperature of the turbine exhaust at 27 and the differentiator provides a continuous signal indicative of the rate of change of turbine exhaust temperature. If the compressor discharge pressure starts to rapidly decay at a rate greater than the reference rate while at the same time the turbine exhaust temperature starts to rapidly increase at a rate above the reference rate, then there will be provided an output stall signal from the gate 50. Although not specifically shown, it will be understood that the above described latching circuit 72 and system selector 74 may also be used in conjunction with the embodiments of FIGS. 3 and 4.

Referring now to FIG. 5, where like numerals again designate previously described elements, there is shown still another embodiment for the stall detection system of this invention. Compressor discharge pressure is monitored, differentiated and added to a reference pressure rate at summing junction 56 in the manner previously described in relation to FIG. 3. The turbine temperature is also continuously monitored and added to a reference temperature at summing junction 48 in the manner previously described in relation to FIG. 1. A latching circuit 64 receives the pressure rate signal from the summing junction 56 and directs a control voltage Vo to a switch 66. The latching circuit 64 during normal engine operation receives a positive input signal from the summing junction 56 and latches a negative control voltage Vo− to the switch 66, which remains open. In the event of a compressor stall or rapid engine deceleration, the compressor discharge pressure will rapidly decrease, causing a large negative rate of pressure change. When this negative rate of pressure change exceeds the reference rate of generator 54, the signal from summing junction 56 will become negative and switch the latching circuit 64 to a positive control voltage Vo+ as shown by the phantom switcher. The positive control voltage Vo+ in turn operates to close switch 66 so that if there is a corresponding increase in turbine temperature above the reference temperature of generator 49, as will occur during a stall condition, the signal from summing junction 48 will become positive and provide an output stall signal. It will be appreciated that the stall signal will remain present as long as the turbine remains in the over-temperature condition. When the turbine over-temperature disappears, as through the initiation of corrective action, the positive output signal from switch 66 will become negative and operate through feedback conduit 68 to unlatch the latching circuit 64 which, in turn, will operate to open switch 66, resetting the entire system.

During a compressor stall, the curve of turbine exhaust temperature versus time may vary depending upon the engine design, the inlet duct design, and the cause of the compressor stall. During some compressor stalls there may be a high initial surge of turbine temperature rapidly reaching a peak. This may be followed by a longer period of sustained over-temperature below the peak level wherein the temperature remains sufficiently high to cause turbine damage if allowed to continue. Therefore, it may be desirable to unlatch the latching circuit 64 at a reference temperature below that of generator 49. This may be accomplished by a separate unlatching reference temperature generator 69 in conjunction with a summing junction 67 as shown in FIG. 6 where like numerals again designate previously described elements. The unlatching reference temperature generator 69 furnishes a signal, the value of which is less than the signal of generator 49 but still representative of a temperature above which the turbine will incur damage if sustained for any period of time. When the turbine over-temperature decreases below the unlatching reference temperature, the positive output signal from summing junction 67 will become negative and operate through feedback conduit 68' to unlatch the latching circuit 64 which, in turn, will operate to open switch 66, resetting the entire system.

Referring now to FIG. 7 where like numerals designate previously described elements, there is shown another embodiment for the stall detection system of this invention. The compressor pressure ratio is monitored and added to a reference pressure ratio at summing junction 42 and the turbine temperature is monitored and added to a reference temperature at summing junction 48 in the manner previously described in relation to FIG. 1. The latching circuit 64, switch 66, and unlatching reference temperature 69 all operate in the manner previously described in relation to FIGS. 5 and 6. However, it is understood that the unlatching reference temperature 67 could be eliminated in the manner of FIG. 5.

Referring to FIG. 8, where like numerals again designate previously described elements, there is shown still another embodiment for the stall detection system of this invention wherein the stall detecting parameters utilized are the rate of change of compressor discharge pressure and the rate of change of turbine temperature as previously discussed in relation to Flg. 4. There is also included a latching circuit 64 and switch 66 which operate in the manner of FIGS. 5 through 7. Because the actual compressor stall condition may persist after the rate of decrease of compressor discharge pressure decays below the reference rate and after the rate of change of turbine temperature decreases below the reference rate, it is important that the stall signal remain latched on until the actual turbine temperature decreases below an established safe limit. To this end, there is provided a second latching circuit 72' together with the unlatching reference temperature generator 69 in conjunction with the summing junction 67 so that an initial stall signal remains latched on until a negative output signal is received through feedback conduit 68' to unlatch the latching circuit 72'. The selector 94 may be switched by the aircraft pilot through input 92 in order to control the unlatching of latching circuit 72' as a function of either rotation of the power control lever 76 or as a function of an external unlatching signal applied through input 80. In this manner engine power will not be reinstated until either the turbine temperature decreases below a safe limit or a signal from the power control lever or an external source is applied to the latching circuit 72' after the compressor stall condition has been corrected.

Referring to FIG. 9 where like numerals designate previously described elements there is shown another embodiment for the stall detecting means of this invention which operates in the manner of FIG. 8 wherein the compressor pressure ratio parameter of FIG. 1 has been substituted in place of the discharge pressure rate parameter.

Accordingly, while preferred embodiments and a preferred application of the present invention have been depicted and described, it will be appreciated by those skilled in the art that many modifications, substitutions, and changes may be made thereto without departing from the invention's fundamental theme. For example, the signal polarities herein described have been only arbitrarily established and, as is readily apparent, could be reversed without departing from the invention's scope. Also, the gas turbine engine previously described could be of the turbofan or turboshaft type with two or more compressor and turbine rotors and may incorporate an afterburner for additional thrust augmentation. Therefore, having described preferred embodiments of the invention, what is desired to be secured by letters patent is as follows.

What is claimed is:

1. A stall warning system for a gas turbine engine of the type having a compressor, combustor, turbine and exhaust duct in serial flow relation comprises:
   means for detecting pressure in at least one location along the compressor inlet and outlet flowpaths thus providing a signal indicative of the detected pressure;
   first comparator means for receiving the detected compressor pressure signal and comparing the detected signal with a reference signal to provide an output signal representative of an abnormal decrease in compressor pressure;
   means for detecting a temperature representative of turbine temperature thus providing a signal indicative of the detected temperature;
   second comparator means for receiving the detected temperature signal and comparing the detected signal with a reference signal to provide an output signal representative of an abnormal increase in turbine temperature; and
   gate means for providing an output signal indicative of engine stall upon receipt of both a signal from the first comparator means representative of an abnormal decrease in compressor pressure and a signal from the second comparator means representative of an abnormal increase in detected temperature thereby precluding the possibility of a false stall signal occurring during normal operation of the engine.

2. The stall warning system of claim 1 wherein:
   the means for detecting compressor pressure includes a first conduit terminating in a pressure pickup inlet stationed within the compressor annular inlet and a second conduit terminating in a pressure pickup inlet suitably disposed at the discharge side of the compressor; and
   the first comparator means includes a computer means for receiving the compressor inlet and discharge pressure from the detecting means and calculating the ratio of compressor discharge pressure to compressor inlet pressure providing an output signal indicative of the compressor pressure ratio; a reference generator for providing an output signal indicative of the minimum compressor pressure ratio during normal compressor operation, and a first summing means for combining the reference generator pressure ratio signal with the computed pressure ratio signal to provide an output signal, the polarity of which is indicative of an actual compressor pressure ratio which has fallen below the minimum compressor ratio for normal operation.

3. The stall warning system of claim 2 wherein:
   the second comparator means includes a reference generator for providing an output signal indicative of the maximum turbine temperature during normal engine operation, and a second summing means for combining the reference generator temperature signal with the detected temperature to provide an output signal, the polarity of which is indicative of an actual turbine temperature which has risen above the maximum turbine temperature for normal engine operation.

4. The stall warning system of claim 3 wherein:
   the gate means includes a latching circuit which receives the signal from the first summing means and latches an output control voltage when the signal from the first summing means is of the polarity indicative of an actual pressure ratio which has fallen below the minimum pressure ratio during normal compressor operation, and a switch which transmits a signal indicative of compressor stall upon both latching of the output control voltage by the latching circuit and upon receipt from the second summing means of a signal having a polarity indicative of a turbine temperature which has risen above the maximum turbine temperature for normal engine operation.

5. The stall warning system of claim 4 including a feedback conduit which operates to unlatch the output control voltage from the switch and thereby open the switch when the actual turbine temperature decreases below the maximum turbine temperature for normal engine operation.

6. The stall warning system of claim 3 wherein there is further provided a latching circuit for receipt of the stall warning signal from the gate means in order to maintain the stall warning signal for a time period after either the turbine temperature decreases below the reference temperature, or the pressure ratio increases above the reference ratio.

7. The stall warning system of claim 6 wherein there is further provided a system selector means whereby the stall signal may be selectively applied to provide a visual warning or initiate compressor stall correcting action.

8. The stall warning system of claim 2 wherein:
   the second comparator means includes a differentiator for receiving the turbine temperature from the detecting means for differentiation thereof, so as to provide an output signal representative of the rate of change of turbine temperature, a reference generator for providing an output signal indicative of the maximum rate of change for turbine temperature during normal engine operation, and a second summing means for combining the reference generator temperature rate signal with the computed temperature rate signal to provide an output signal, the polarity of which is indicative of an actual rate of increase in turbine temperature which exceeds the maximum rate of change for turbine temperature during normal engine operation.

9. The stall warning system of claim 8 wherein:

the gate means includes: a first latching circuit which receives the signal from the first summing means and latches an output control voltage when the signal from the first summing means is of the polarity indicative of an actual pressure ratio which decreases below the minimum pressure ratio during normal compressor operation, a switch which transmits a signal indicative of compressor stall upon both latching of the output control voltage by the latching circuit and upon receipt from the second summing means of a signal having a polarity indicative of a rate of turbine temperature increase which has risen above the maximum rate of turbine temperature increase for normal engine operation, and a second latching circuit which maintains the stall signal until the actual turbine temperature decreases below an established safe limit.

10. The stall warning system of claim 9 including a feedback conduit which operates to unlatch the second latching circuit when the actual turbine temperature decreases below the maximum turbine temperature for normal engine operation.

11. The stall warning system of claim 8 wherein there is further provided a latching circuit for receipt of the stall warning signal from the gate means in order to maintain the stall warning signal for a time period after either the rate of turbine temperature increase decreases below the reference rate or the pressure ratio increases above the reference ratio.

12. The stall warning system of claim 11 wherein there is further provided a system selector means whereby the stall signal may be selectively applied to provide a visual warning or initiate compressor stall correcting action.

13. The stall warning system of claim 1 wherein:
the means for detecting compressor pressure includes a conduit terminating in a pressure pickup inlet suitably disposed at the discharge side of the compressor; and
the first comparator means includes a differentiator for receiving the compressor discharge pressure from the detecting means for differentiation thereof, so as to provide an output signal representative of the rate of change of compressor discharge pressure, a reference generator for providing an output signal indicative of the maximum rate of change for compressor discharge pressure during normal compressor operation, and a first summing means for combining the reference generator pressure rate signal with the computed pressure rate signal to provide an output signal, the polarity of which is indicative of an actual rate of decrease in compressor discharge pressure which exceeds the maximum rate of change for compressor discharge pressure during normal compressor operation.

14. The stall warning system of claim 13 wherein:
the second comparator means includes a reference generator for providing an output signal indicative of the maximum turbine temperature during normal engine operation, and a second summing means for combining the reference generator temperature signal with the detected temperature to provide an output signal, the polarity of which is indicative of an actual turbine temperature which has risen above the maximum turbine temperature for normal engine operation.

15. The stall warning system of claim 14 wherein:
the gate means includes a latching circuit means which receives the signal from the first summing means and latches an output control voltage when the signal from the first summing means is of the polarity indicative of an actual rate of decrease of compressor discharge pressure which exceeds the maximum rate of decrease of compressor discharge pressure during normal compressor operation, and a switch which transmits a signal indicative of compressor stall upon both latching of the output control voltage by the latching circuit and upon receipt from the second summing means of a signal having a polarity indicative of a turbine temperature which has risen above the maximum turbine temperature for normal engine operation.

16. The stall warning system of claim 15 including a feedback conduit which operates to unlatch the output control voltage from the switch and thereby open the switch when the actual turbine temperature decreases below the maximum turbine temperature for normal engine operation.

17. The stall warning system of claim 14 wherein there is further provided a timed hold means which receives the signal from the first summing means and maintains presence of the signal at the gate means and a latching circuit for receipt of the stall warning signal from the gate means in order to maintain the stall warning signal for a time period after either the rate of pressure decrease decays below the reference rate or the turbine temperature decreases below the reference temperature.

18. The stall warning system of claim 17 wherein there is further provided a system selector means whereby the stall signal may be selectively applied to provide a visual warning or initiate compressor stall correcting action.

19. The stall warning system of claim 13 wherein:
the second comparator means includes a differentiator for receiving the turbine temperature from the detecting means for differentiation thereof, so as to provide an output signal representative of the rate of change of turbine temperature, a reference generator for providing an output signal indicative of the maximum rate of change for turbine temperature during normal engine operation, and a second summing means for combining the reference generator temperature rate signal with the computed temperature rate signal to provide an output signal, the polarity of which is indicative of an actual rate of increase in turbine temperature which exceeds the maximum rate of change for turbine temperature during normal engine operation.

20. The stall warning system of claim 19 wherein the gate means includes a first latching circuit which receives the signal from the first summing means and latches an output control voltage when the signal from the first summing means is of the polarity indicative of an actual rate of decrease of compressor discharge pressure which exceeds the maximum rate of decrease of compressor discharge pressuring during normal compressor operation, and a switch which transmits a signal indicative of compressor stall upon both latching of the output control voltage by the latching circuit and upon receipt from the second summing means of a signal having a polarity indicative of an actual rate of turbine temperature change which exceeds the maximum rate of temperature change for normal operation and a second latching circuit which maintains the stall signal until the actual turbine temperature decreases below an established safe limit.

21. The stall warning system of claim 20 including a feedback conduit which operates to unlatch the second latching circuit when the actual turbine temperature decreases below the maximum turbine temperature for normal operation.

22. The stall warning system of claim 19 wherein there is further provided a timed hold means which receives the signal from the first summing means and maintains presence of the signal at the gate means and a latching circuit for receipt of the stall warning signal from the gate means in order to maintain the stall warning signal for a time period after either the rate of pressure decrease decays below reference rate of pressure change or the rate of turbine increase decreases below the reference rate of turbine change.

23. The stall warning system of claim 22 wherein there is further provided a system selector whereby the stall signal may be selectively applied to provide a visual warning or initiate compressor stall correcting action.

* * * * *